United States Patent
Warner

(10) Patent No.: US 7,849,018 B1
(45) Date of Patent: Dec. 7, 2010

(54) TRACKING DOWNLOAD OF AN APPLICATION COMPONENT

(75) Inventor: Steven Warner, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 413 days.

(21) Appl. No.: 11/492,289

(22) Filed: Jul. 24, 2006

(51) Int. Cl.
  *G06Q 99/00* (2006.01)
(52) U.S. Cl. .............. 705/59; 705/50; 705/51; 705/57; 705/52; 705/53; 713/150; 726/26; 726/33; 380/200
(58) Field of Classification Search ............. 705/50–59; 726/26–33; 713/150; 380/200–203
  See application file for complete search history.

(56) References Cited

U.S. PATENT DOCUMENTS

| 2002/0087957 | A1* | 7/2002 | Norris et al. ............... 717/163 |
| 2005/0278258 | A1* | 12/2005 | O'Donnell et al. ........... 705/59 |
| 2006/0031163 | A1* | 2/2006 | Kivipuro et al. .............. 705/50 |
| 2006/0168323 | A1* | 7/2006 | Kim et al. .................... 709/238 |
| 2007/0061271 | A1* | 3/2007 | Ala-Luukko ................ 705/64 |
| 2008/0250239 | A1* | 10/2008 | Risan et al. ................. 713/153 |

OTHER PUBLICATIONS

Microsoft, Text converters installed during an "Install Now" setup, http://support.microsoft.com/kb/236051/EN-US/.

* cited by examiner

*Primary Examiner*—Jalatee Worjloh
(74) *Attorney, Agent, or Firm*—Van Pelt, Yi & James LLP

(57) ABSTRACT

Recording information used in determining a licensing fee related payment is disclosed. An application is provided without a component associated with the application, where the component is associated with a licensing fee. Information associated with obtaining the component for use with the application is received. At least some of the received information is recorded, where the recorded information is used in determining licensing fee related payment to be paid for the component.

22 Claims, 7 Drawing Sheets

DOWNLOAD DATABASE 600

| DATE | TIME | PRODUCT ID | SERIAL NO. | COMPONENT ID | BROWSER | IP ADDRESS |
|---|---|---|---|---|---|---|
| 5/15/2006 | 15:49:18 | A | A827LK4 | 0010 | INTERNET EXPLORER | 192.150.14.120 |
| 5/15/2006 | 20:16:31 | B | B631BJ0 | 0011 | MOZILLA FIREFOX | 192.150.14.121 |
| 5/16/2006 | 1:30:56 | A | A827LK4 | 0010 | MOZILLA FIREFOX | 192.150.14.122 |
| 5/16/2006 | 4:25:43 | C | C795FD1 | 0009 | MOZILLA FIREFOX | 192.150.14.123 |

TRACKING DOWNLOAD OF AN APPLICATION COMPONENT

BACKGROUND OF THE INVENTION

Some software applications include technology components for which licensing or royalty fees must be paid to a licensing pool or a licensor. These licensing fees are paid by the software company, such as Adobe Systems Incorporated, as opposed to an end user of the software application. Some of these licensing payments are substantial and can severely affect the profitability of a product, especially in the consumer space. Under the terms of certain licensing agreements, payment is required as long as a component resides on a user's computer. Even though a user may not necessarily have used a component that is installed on or otherwise residing on his computer, a licensing fee must be paid for the component. It would be useful to develop new techniques for reducing payments associated with licensing fees.

BRIEF DESCRIPTION OF THE DRAWINGS

Various embodiments of the invention are disclosed in the following detailed description and the accompanying drawings.

FIG. 6 is a diagram illustrating an embodiment of a download database.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
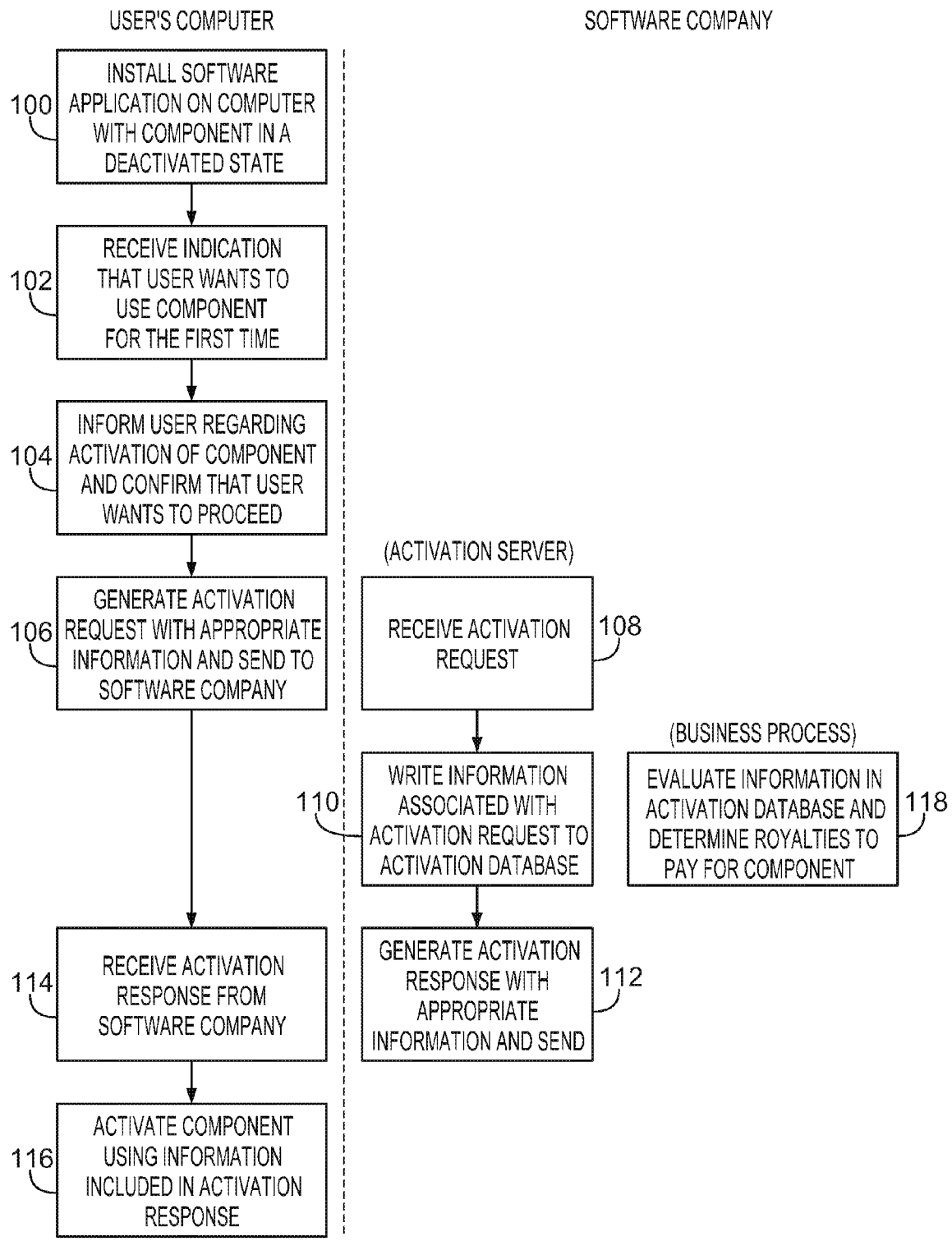
FIG. 1 is a flowchart illustrating an example of a technique for tracking activation of a component for license payment related purposes.

FIG. 1 is a flowchart illustrating an example of a technique for tracking activation of a component for license payment related purposes. In the example shown, a component is used by an application and licensing fees must be paid for the component. License fees are paid by the software company that develops or distributes an application (rather than a user) to a licensor or license pool. The amount of money paid depends on business rules that describe how licensing fees are assessed and may be specified under the terms of a licensing agreement. Royalties and licensing fees/payments are used interchangeably herein and include fees or payments associated with (for example) a technology component that is claimed or included in (for example) a patent or other intellectual property.

At 100, a software application is installed on a computer with a component in a deactivated state. In this example, under certain business rules it may be acceptable to install a component on a user's computer without paying a licensing fee as long as the user does not use the component. Therefore, although a component is written to a computer's hard drive at installation, the component is in a deactivated state or mode that makes the component unavailable to the user, the user's system, or to an application. Any appropriate technique may be use to put or otherwise have the component in a deactivated state. For example, in some cases, an activation key or code is required for the component to be activated and available for a user to use. In one example, the application is Adobe® Premiere® Pro and the component is a Moving Picture Experts Group-2 (MPEG-2) CODEC. After initial installation of Adobe Premiere Pro, the MPEG CODEC is installed, but not activated.

An indication is received that a user wants to use a component for the first time at 102. For example, if the component is an MPEG CODEC, an indication may be triggered when a user requests a feature or operation of an application that requires use of the MPEG CODEC.

At 104, a user is informed regarding activation of a component and it is confirmed that a user wants to proceed. For example, some applications are configured to present a user with a dialog box advising a user that the selected feature or operation of the application (or the associated component) requires activation, activation is free, etc. In some applications, a user is able to select how they want to contact a software company to perform activation. For example, a user can choose to perform activation over the Internet, on the phone, etc. In some applications, a user provides a Yes/No response to a query "Would you like to proceed with activation?" to confirm that (s)he wants to proceed and some subsequent activation related step is automatically triggered by an application. In some embodiments, confirmation that a user wants to proceed is obtained by having the user manually (1) start an Internet browser application (if one is not already running) and go to an activation website or (2) call a telephone number for activating a component.

An activation request is generated with appropriate information and sent to a software company at 106. Some applications are configured to allow a user to select how (s)he wants to contact a software company to activate a component and generation and transmission at 106 in such cases depends upon how a user contacts a software company. For example, using an Internet option, a connection to Adobe (e.g., using an Internet browser application such as Mozilla Firefox or Microsoft Internet Explorer and opening a specific Uniform Resource Locator (URL) or website associated with activation) is established or otherwise created. A request is sent that includes, for example, the serial number of the installed application or other product data. To activate a component over the phone, a user calls a call center associated with activation and reads off the serial number of the installed application or other product identifier to a call center operator.

An activation request is received at 108. For example, an activation request is received from a user themselves or from the actions of someone at a call center. Information associated with an activation request is written to an activation database at 110. Some examples of the information written to an activation database include the time and date when an activation request is received, serial number, etc.

An activation response with appropriate information is generated and sent at 112. An activation response is received from a software company at 114. For example, an activation response may include an activation code that an application requires in order for a component to be activated. If a user activates a component over the Internet, the activation code may be displayed on a webpage by an Internet browser application. If a user activates a component over the phone, the activation code may be communicated verbally by a call center operator. In some cases, a call center operator goes to the same website that a user who activates a component over the website is directed to and performs the same interactions.

At 116, a component is activated using information included in an activation response. For example, a dialog box may be presented saying, "Please enter the activation code." A user may enter an activation code (e.g., obtained over the phone or over the Internet) in this dialogue box. If the entered value matches some expected value, the component is activated and the user is able to immediately use the component (or some feature or operation of the application that uses the component). For example, if the component is a MPEG CODEC, the user is able to use a CODEC to compress or decompress A/V data. In some cases, the entered activation code is stored in a registry (e.g., associated with that application). At subsequent uses of the CODEC, storage of the activation code in the registry ensures that subsequent activation is not required. On systems without a registry, alternative techniques may be used such as writing a data file to disk.

At 118, information in an activation database is evaluated and royalties to pay for a component are determined. For example, some process or entity may process the information in an activation database and determine (e.g., based on business rules associated with how licensing fees are calculated) the amount of money owed for a component. Determination of licensing fees to pay may be performed independently of the activation process that a user is involved in. For example, determination at 118 may occur once a week, once a quarter, or however often licensing payments are paid for the component. Some processes or entities are configured to process the information in an activation database and generate reports of the number of aggregate activation requests per product (e.g., Adobe Premiere Pro) have been received, how many activation requests have been received per serial number, or any other reports.

Typically, the amount of time to perform activation (e.g., as perceived by a user) is relatively quick. For example, activation may require a few seconds or a few minutes and a user may be able to continue using an application with minimal interruption.

Although the described technique reduces costs for a software company (e.g., licensing fees are only paid for those copies of applications where the component is actually used rather than for all copies that is sold), this technique and other existing techniques may not be useful or feasible in all scenarios. For example, under certain business rules, a software company may be unable to distribute a component without paying for the component. The existing technique described above may not offer a reduction in licensing payments. Techniques to address this scenario and other scenarios in which existing techniques offer little or no savings in licensing payments would be useful.

Figure 2:
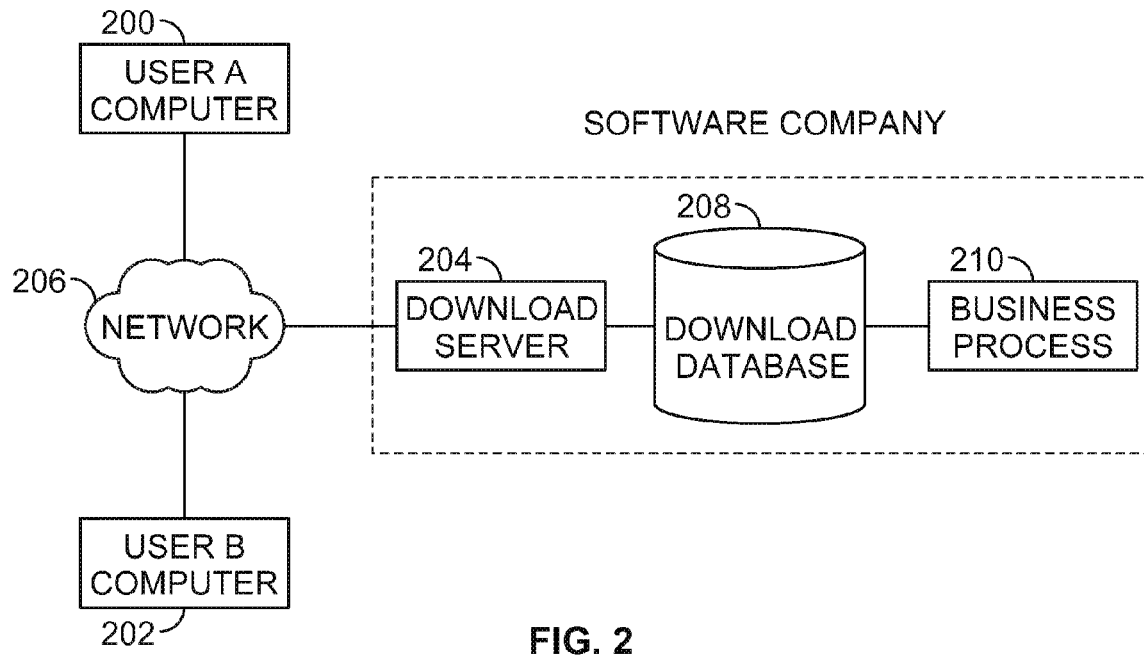
FIG. 2 is a system diagram illustrating an embodiment of a system for downloading a component when the component is first needed by a user.

FIG. 2 is a system diagram illustrating an embodiment of a system for downloading a component when the component is first needed by a user. In the example shown, there is a royalty or licensing fee associated with the component. An application (e.g., Adobe Premiere Pro) may use or have features or operations that rely upon this component. In some embodiments, the component may be a CODEC (coder-decoder) such as a CODEC for MPEG-2, MPEG-4, H.264, Advanced Audio Coding (AAC), Dolby Digital, etc. In some embodiments, the component is a motion tracker. It is not necessary for a component to be related to audio and/or video technology and a component may be any component that is associated with a licensing fee (e.g., stock images, clip art, or other content).

In the example shown, one or more applications are installed on computers 200 and 202. These applications are installed without a particular component that has a licensing fee associated with the component. In some embodiments, a software company that develops or distributes the application pays the licensing fee associated with a component, rather than a user or consumer who purchases the application. In some embodiments, the code, plug-in or other implementation of a component is not included on installation media and is thus not loaded or written to computers 200 and 202 when installation is performed using an installation disk. Similarly, if installation is performed in some other manner (e.g., purchasing an application using an Internet browser application and downloading the application) the component is similarly not loaded or written to computers 200 and 202 at the time of download.

If a user wants to use a component (e.g., selects a feature or command of an application associated with a component), download server 204 is contacted via network 206. Any appropriate connection may be used. In some embodiments, an Internet browser application is initiated and a URL associated with download server 204 is provided to the Internet browser application. Starting an Internet browser application and/or going to a particular URL or webpage may be performed manually by a user or automatically initiated by an application. In some embodiments, a connection to download server 204 is established without initiating or invoking an Internet browser application. Download server 204 is implemented as appropriate depending on the connections or interfaces to computers 200 and 202 supported by a particular embodiment. For example, in embodiments where an Internet browser application is used, download server 204 is a Hypertext Transfer Protocol (HTTP) server or web server.

In some embodiments, a process to obtain a component is initiated and/or performed automatically without user interaction or awareness. For example, in some embodiments an automated process to obtain the component is triggered when a user selects a feature, capability, or operation associated with the component for the first time. In some embodiments, an application communicates in the background with a server to download or otherwise obtain a component that has a licensing fee associated with it. A user may not necessarily be aware or be required to do anything to obtain a component. Although some examples described below may describe user interaction associated with downloading or obtaining a component, in some embodiments some or all of a process to obtain a component is performed automatically.

A request associated with downloading a component is generated and sent to download server 204 via network 206 from computer 200 or 202 when (for example) a user of the computer wants to use a component for the first time. Appropriate information (e.g., identifying the component, application, identifying the particular copy of the application using a serial number, associated with a client device, associated with a user, etc.) is included in request.

A request is received and processed by download server 204. In some embodiments, there is some checking or verification performed to determine that the request is a legitimate request to download a component. In embodiments where such checking exists and it has been determined that a request is legitimate (e.g., based on information included in a request), an appropriate response is generated and transmitted to the appropriate computer via network 206. In some embodiments, the response includes a component (e.g., as an attachment or otherwise included in a response) or indicates that a component will be downloaded shortly. In some embodiments, a download response includes a download key or code, and a component is downloaded following a prescribed sequence of handshakes or communications using this download code. For example, in some embodiments, another server may provide the component to reduce the load of a server that updates a download database. A download code may be presented to this other server to obtain the component. After obtaining a component, the user is able to proceed with using the application.

Information associated with requests received by download server 204 is written to download database 208. Business process 210 has access to download database 208 and processes the information stored there to determine licensing payments to be paid. In some embodiments, business process 210 determines licensing payments on a periodic basis corresponding to how frequently licensing fees are paid (e.g., every month, every quarter, etc.). In some embodiments, business process 210 determines how much money to pay based on business rules that describe how licensing fees are charged for a particular component (e.g., specified in a licensing agreement) and the information stored in download database 208.

In various embodiments, download server 204, download database 208, and/or business process 210 is/are configured to support multiple components, multiple applications, and/or multiple users. In some embodiments, download server 204 is able to support users worldwide. Interfaces may be implemented in a variety of languages for different users. In some embodiments, components for multiple applications are able to be downloaded using download server 204. For example one user may download a component for a first application while another user downloads a component for a second application. In some embodiments, multiple components (each of which has a licensing fess associated with it) are used with a given application. In some embodiments, a user or a client configured to obtain components interacts with download server 204 at a first point in time to download a first component and at a second point in time to download a second component. Information stored in download database may reflect that a user interacted with download server 204 two times to download the first and second component, respectively. In some embodiments, download database 208 is a global repository that includes information associated with multiple licensors or license pools (i.e., the one or more entities that are owed a licensing fee for a particular component). Business process 210 may evaluate information stored in download database 208 and determine a first amount of money owed to a first licensor, determine a second amount of money owed to a second licensor, etc.

Figure 3:
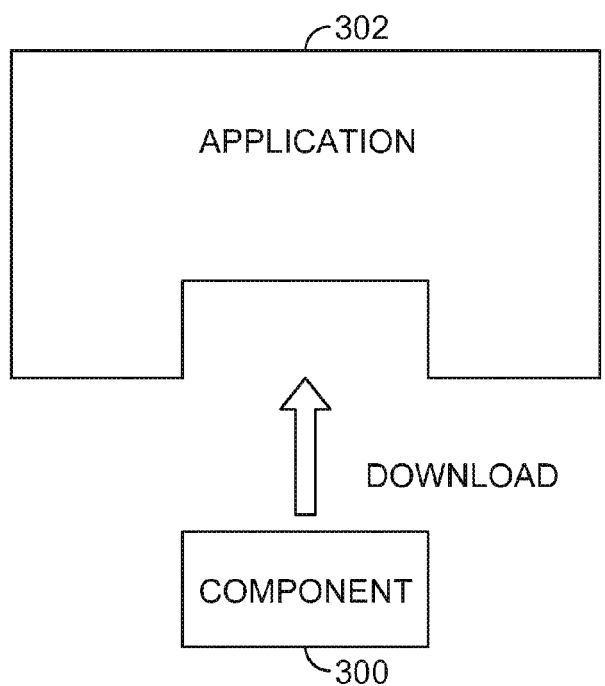
FIG. 3 is a diagram illustrating an embodiment of a component that is downloaded when use of the component is requested for the first time.

FIG. 3 is a diagram illustrating an embodiment of a component that is downloaded when use of the component is requested for the first time. In the example shown, component 300 is downloaded to a computer on which application 302 is installed. In some embodiments, component 300 has certain characteristics that make downloading component 300 and/or tracking of such downloads desirable or otherwise attractive. However, it is not required that component 300 have some or all of the example characteristics described with respect to this example. In some embodiments, a component that is downloaded has other characteristics besides the example characteristics described herein.

In some embodiments, the size of component 300 is relatively small so that downloading or otherwise obtaining component 300 (e.g., over a typical network that a user is expected to have access to) is relatively fast. For example, in some embodiments downloading component 300 may take on the order of a few seconds or at most a few minutes. Downloading or otherwise obtaining component 300 may occur while a user is in the middle of using application 302. It may be desirable for a process of obtaining a component to be relatively fast (e.g., on the order of a few seconds) since users may become impatient and annoyed if obtaining a component takes too long.

In some embodiments, component 300 and/or application 302 is/are configured or implemented so that component 300 is able to be used after downloading without stopping or otherwise interrupting application 302. For example, it may be undesirable to require a user to close application 302 after downloading component 300. Similarly, it may be annoying to reboot a computer on which application 302 is installed and running. In some embodiments, component 300 is written as a file to a computer and is able to be used without stopping application 302. In some embodiments, a component is implemented or written to a computer in some other form besides a file.

Figure 4:
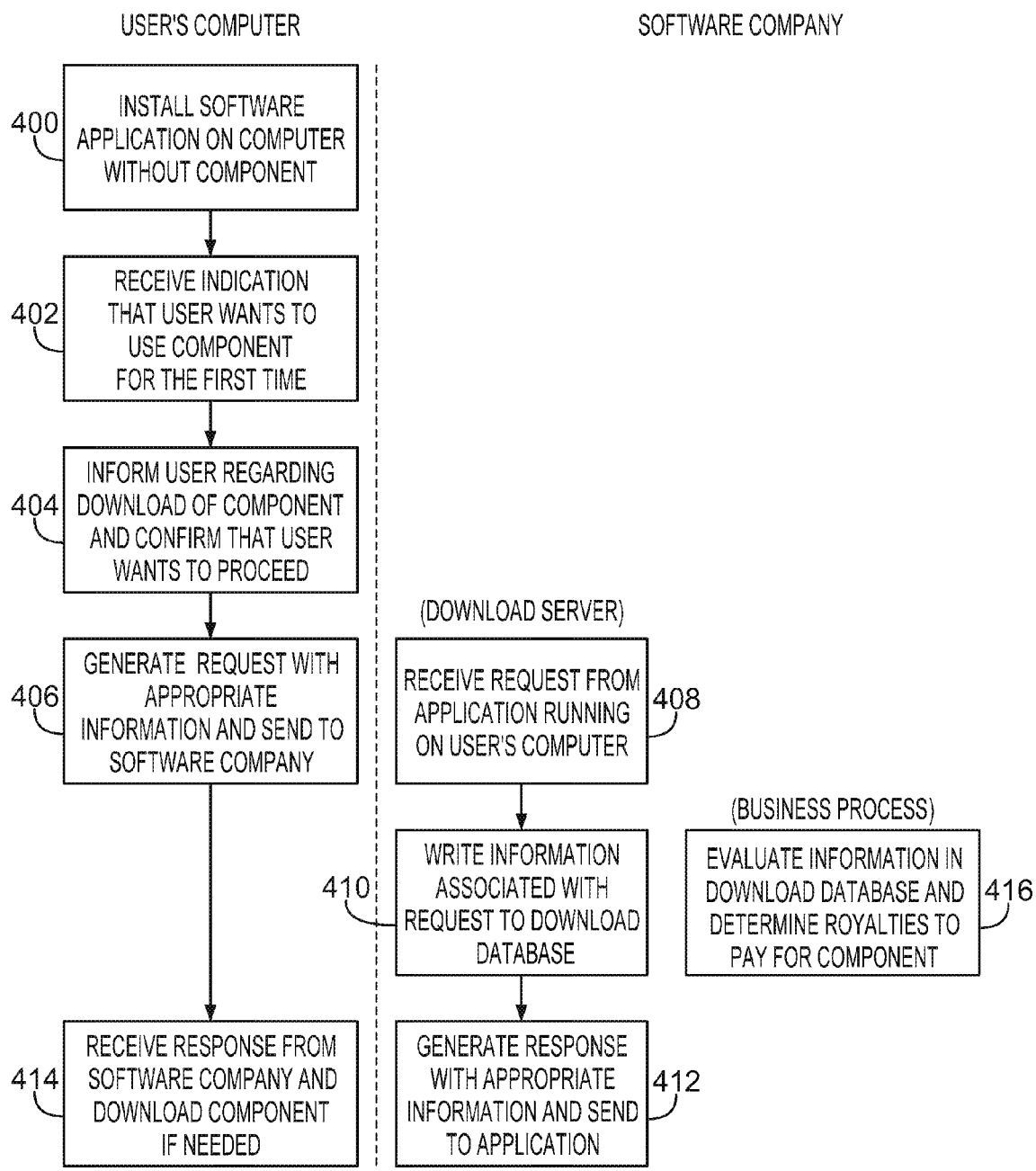
FIG. 4 is a flowchart illustrating an embodiment of a process for tracking download of a component for determination of licensing fees.

FIG. 4 is a flowchart illustrating an embodiment of a process for tracking download of a component for determination of licensing fees. In the example shown, some of the process is performed on a user's computer, for example by the application that a component is to be used with, some of the process is performed by a download server, and some of the process is performed by a business process.

At 400, a software application is installed on a computer without a component. The component is associated with one or more business rules that describe how licensing fees are to be calculated or charged. In various embodiments, the business rules include various terms. In some embodiments, a business rule stipulates that a license fee is to be paid when a component is distributed to a user, regardless of whether or not that component is actually used. In some embodiments, a business rule stipulates or otherwise allows for a component to be distributed with an application in a deactivated state and licensing fees are not charged until a user actually uses the component. The techniques described herein for tracking download of a component may be used with a variety of business rules, as appropriate.

An indication is received at 402 that a user wants to use a component for the first time. For example, a user may select a particular operation using a pull-down menu of an application (or alternatively click on a button) and that operation may require use of a component. Selection of the operation or some other interaction with an application by the user may generate or otherwise comprise an indication that the user wants to use a component.

In some embodiments, a registry is checked to determine if this is the first time a user wants to use a component. For example, a particular value in a registry may be associated with the component. Upon installation of an application (without the component), this value is set to a default or initial value that indicates the component is not stored on a computer. After downloading a component, the value is changed to reflect that a component has been downloaded or written to a computer. In some embodiments, other techniques are used to determine if this is the first time a user wants to use a component. For example, the existence of a file with certain characteristics (e.g., containing a particular value, having a particular name, located in a certain directory, etc.) may indicate that a component has been downloaded.

At 404, a user is informed regarding download of a component and it is confirmed that a user wants to proceed. In various embodiments, various dialog boxes or messages may be presented to a user. For example, in some embodiments a window may be presented to a user saying, "This item must be downloaded before it can be used. Download is anonymous and takes only a few seconds. Would you like to proceed?" A user may push a Yes or No button included in the window.

A request is generated with appropriate information and sent to a software company at 406. Some examples of information included in a request include: serial number, application ID, component ID, and/or a request key or code. For example, the request code may be the serial number, the component ID, a first cyclic redundancy check (CRC), and second CRC concatenated together. In some embodiments, some additional security information is sent to validate the request.

In some embodiments, an Internet browser application is used (e.g., to exchange a request between a download server and a user's computer). In some embodiments, a connection is established using a network adapter without invoking or otherwise running an Internet browser application.

Exchanging information between a download server and a user's computer may be automated, performed manually, or some combination of the two. For example, in some embodiments, requests are automatically generated and transmitted by an application to a download server without requiring direction or input from a user. The serial number or other information is automatically included in a request by an application or other process that assembles a request. In some embodiments, a user manually performs one or more steps. For example, a user may start an Internet browser application, go to a particular website or URL for downloading, obtain the serial number (e.g., by reading it from the box of the installation disk, by bringing up a help window with the serial number displayed, etc.), provide the serial number or other information via the website, etc.

At 408, a request is received from an application running on a user's computer. In some embodiments, one or more keys or codes are exchanged between a user's computer and a download server to verify that a communication is legitimate and is not (for example) from a spammer or some malicious entity. In some embodiments, a code is based upon a hash and/or the serial number of a product. In some embodiments, both the user side and the server side know the particular formula or process of generating a code; a receiver is able to double check or otherwise confirm that a received code matches an expected code. If a received value does not match an expected code (if such a code is used), then in some embodiments the process may go to an error or exception handling mode.

At 410, information associated with a request is written to a download database. Some or all of the information included in a received request is written to a download database. In some embodiments, a date and/or time when a request is received is/are written to a download database.

At 412, a response with appropriate information is generated and sent to an application. At 414, a response is received from a software company and a component is downloaded if needed. For example, in some embodiments a response includes a download code and the download key is used to download the component. In some embodiments, a response includes the component (e.g., as an attachment) or indicates that the component will be sent shortly thereafter. Transfer of the component itself may occur using a variety of networks, connections, etc. In some embodiments, the component is exchanged using HTTP. In some embodiments, another technique (e.g., emailing the component as an attached file) is used.

In some embodiments, after downloading or otherwise obtaining a component, some setting or configuration is created or modified so a subsequent request of the component does not trigger the download process again. In some embodiments, a registry is used to indicate whether or not a component has been downloaded. In some embodiments, a registry (or other configuration or setting) is checked prior to beginning any handshaking or communication. Any appropriate technique may be used to indicate or otherwise determine that a component has been downloaded.

Information in a download database is evaluated and royalties to pay for a component are determined at 416. In some embodiments, a download database contains information associated with multiple application and/or multiple components. The determination of royalties to pay may be broken down into subcategories or organized as desired. For example, there may be a particular component associated with multiple applications. If so desired, the royalties to pay for that component may be determined for either application separately (e.g., should a software company or the licensor want the breakdown of licensing payments for a component by application) or for both applications together (e.g., if a software company just wants to know how much money to pay to licensor). In some embodiments, determining royalties to pay at 416 is performed independently of the downloading processes performed by an application running on a user's computer and a download server. For example, in some embodiments; the download server responds immediately to provide a copy of component (e.g., should the proper information be provided) whereas a business process may access a download database and process the information stored there periodically (e.g., every month, every quarter, etc.).

Figure 5A:
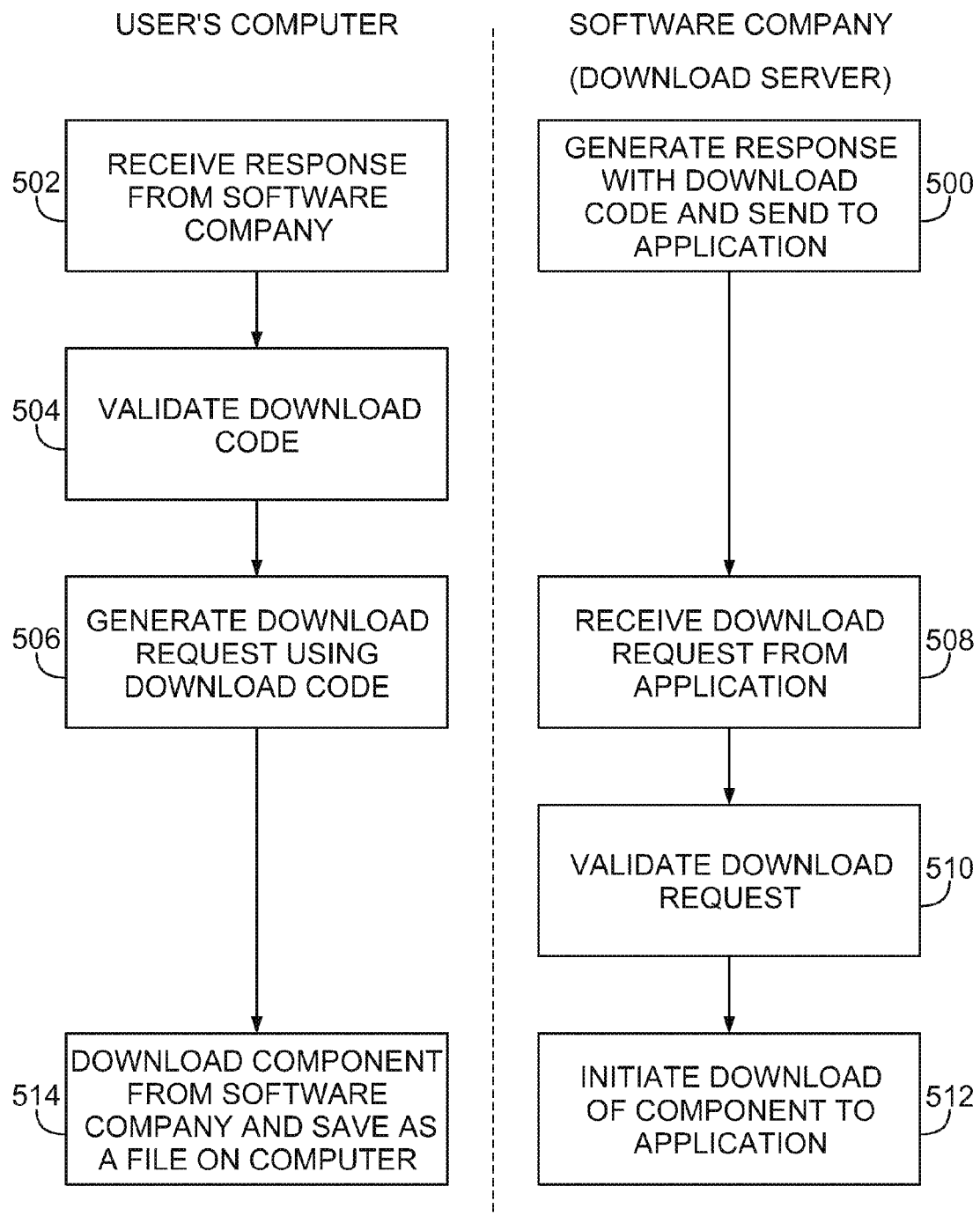
FIG. 5A is flowchart illustrating an embodiment of a process for downloading a component using a download code.

FIG. 5A is flowchart illustrating an embodiment of a process for downloading a component using a download code. In some embodiments, the example process is used at 412 to generate a response and at 414 to receive a response and download a component. In some embodiments, other processes besides this example process are used.

At 500, a response is generated with a download code and sent to an application. At 502, the response is received from a software company. The download code included in a response will be used by the application running on a user's computer to download the component.

A download code is validated at 504. For example, in some embodiments, an application running on a user's computer compares a received download code with an expected code. In some embodiments, a download code is based on a hash of the serial number. For example, the (expected) download code may include CRC 1 concatenated to CRC2 (i.e., the CRC of the serial number concatenated with the CRC applied twice to the serial number). This is merely one example of performing validation. In various embodiments, various techniques for validating are used. In some embodiments, a download code is retrieved from a table or list of codes by a download server. In some embodiments, an application on a user's computer does not validate a download code.

A download request is generated using a download code at 506. In some embodiments, a download code is used to link or otherwise associated a prior communication between a download server and a user's computer (or a state that a download server was in) with the download request. For example, if HTTP is used, the download server may use the download code to associate the download request with prior communications or states.

A download request is received from an application at 508. In some embodiments, a third party (e.g., another server) manages download of a component so that a server responsible for updating a download database is not overburdened. A download request is validated at 510. In some embodiments, a download request is not validated. Download of a component to an application is initiated at 512. At 514, a component is downloaded from a software company and saved as a file on a computer. In some embodiments, a component is obtained from an entity that is not associated with the software company that developed or distributed the application. For example, in some embodiments, a component is obtained from a server managed by or on behalf of the owner of the component.

Figure 5B:
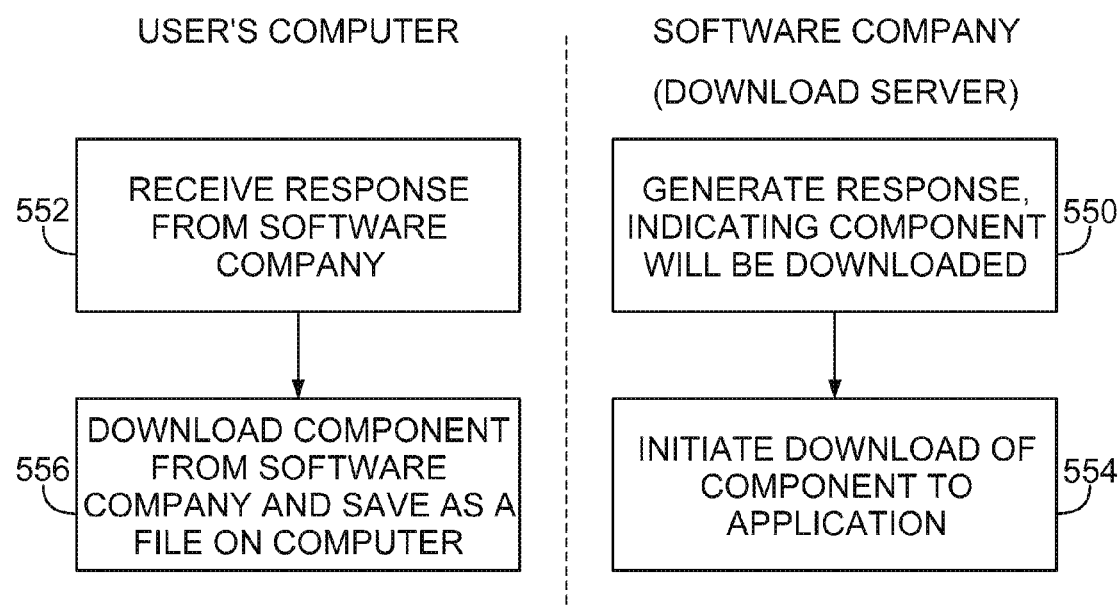
FIG. 5B is a flowchart illustrating an embodiment of a process for downloading a component in response to a request.

FIG. 5B is a flowchart illustrating an embodiment of a process for downloading a component in response to a request. In some embodiments, the example process is used at 412 to generate a response and at 414 to receive a response and download a component.

At 550, a response is generated that indicates a component will be downloaded. For example, a message that indicates handshaking or communication was successful may be generated. At 552, a response is received from a software company.

Download of a component to an application is initiated at 554. A component is downloaded from a software company and saved as a file on a computer at 556. As described above, a component may be downloaded or otherwise obtained from at 554 using a variety of techniques. In some embodiments, a component is transferred using HTTP. In some embodiments, a component is transferred as an attachment of an email message. These are some example of how a component may be downloaded or otherwise transferred.

In this example shown, a component is downloaded without requiring a second or additional request to be sent from an application to a download server. In the example of FIG. 5A, a first request (not shown) is used to obtain a download code and a second request that includes the download code is used to download or otherwise obtain a component. In various embodiments, downloading a component may be performed using the example process illustrated in FIG. 5A, FIG. 5B, or some other process based on various factors. For example, some systems are configured to offload downloading the component to another server so that a server responsible for updating a download server is not overburdened. In such systems, the example process of FIG. 5A may be used. In some embodiments, it is desirable to minimize the number of messages exchanged between an application and a download server and the example process of FIG. 5B may be used in such systems.

FIG. 6 is a diagram illustrating an embodiment of a download database. In the example shown, a download server writes information associated with downloading one or more components to download database 600. A business process may access the information stored in download database 600 to determine licensing payments to be paid.

In the example shown, columns 602 and 604 are used to record the date and time, respectively, when requests were received by a download server. These requests may have been triggered by a user wanting to use a component for the first time. Column 606 contains the product ID associated with a request. The product ID may identify the particular software application for which a component is being requested. Serial numbers in column 608 may identify the particular copy of a product (i.e., software application) and no two copies of a product have the same serial number. Column 610 contains the component ID that identifies the particular component that is being downloaded. The browser name included in column 612 identifies the Internet browser application via which a request is received from a user computer. If a component is obtained using some other technique (e.g., via email, directly using a network adapter without invoking an Internet browser application, etc.) other information that is appropriate for that particular embodiment is recorded. The IP addresses in column 614 are the IP addresses from which a request originated. Other identifiers or references associated with a physical or logical source from which a request originates may be stored in a download database.

A business process or other entity may read the information stored in download database 600 and determine licensing payments to be paid. In the example shown there are entries for three components (e.g., component ID 0009, 0010, and 0011) and a business process may determine licensing payments to be paid for each of the components.

In some embodiments, licensing payments to be paid for a component are based on one or more business rules for that component. Depending upon the business rule, the royalties to pay may vary. For example, a download database may sometimes include duplicate downloads from the same copy of an application. In this example, entry 618 is a duplicate of entry 616. Both entries have the same serial number and thus are associated with the same copy of a product. A duplicate may occur because of a variety of reasons. In some cases, a user's computer has crashed, and the user may wipe his computer and reinstall the application. After reinstallation, a previously downloaded component will have been removed from the computer and will need to be downloaded again should the user want to use the component. Depending upon the business rules, it may not be necessary to pay for the second download since a licensing fee was a paid for the first download. In some embodiments, a business process is configured to detect duplicate downloads and account for duplicate downloads when determining royalties to pay for a component. For example, a business process may process download database 600 and determine that entry 618 is a duplicate of entry 616 based on the serial numbers. The business process may determine (based on the business rules) that there is no licensing fee to be paid for duplicate download 618.

In some cases, a business rule may include a volume licensing agreement where a software company has agreed to pay (e.g., in advance) for a certain number of the licensed items (i.e., the component), typically at a reduced rate. Since some number of the components have been prepaid, a business process may track the number of downloads and there are no licensing fees to be paid until the number of downloads exceeds the prepaid quantity. These are some example of how licensing fees to be paid may be determined using download database 600.

In some embodiments, a variety of reports may be generated using the recorded information in a download database. For example, in some embodiments a process or other entity is configured to generate a report of the number downloads for a given component for a given application. In some embodiments, a process is configured to generate a report that ranks components based on calculated licensing fees (e.g., for that payment period). In some embodiments, a process is configured to generate a report of duplicate downloads (e.g., based on serial number).

In some embodiments, recorded information in a download database is evaluated for fraud or other abuse. Detecting or otherwise identifying (potential) abuse may be performed automatically (e.g., by a business process), manually, or some combination thereof. In some embodiments, if the number of downloads for any copy of an application (e.g., where each copy of an application has a unique serial number) exceeds a threshold then some authority within a software company is notified. In some embodiments, subsequent downloads of a component are not permitted if a request includes a serial number associated with suspected abuse. However, it is not necessary for that there be a process configured to detect or otherwise identify possible fraud or other abuse. In some embodiments, it is assumed that users are trustworthy and/or that enforcement of intellectual property rights is outside the scope of the system.

Figure 7:
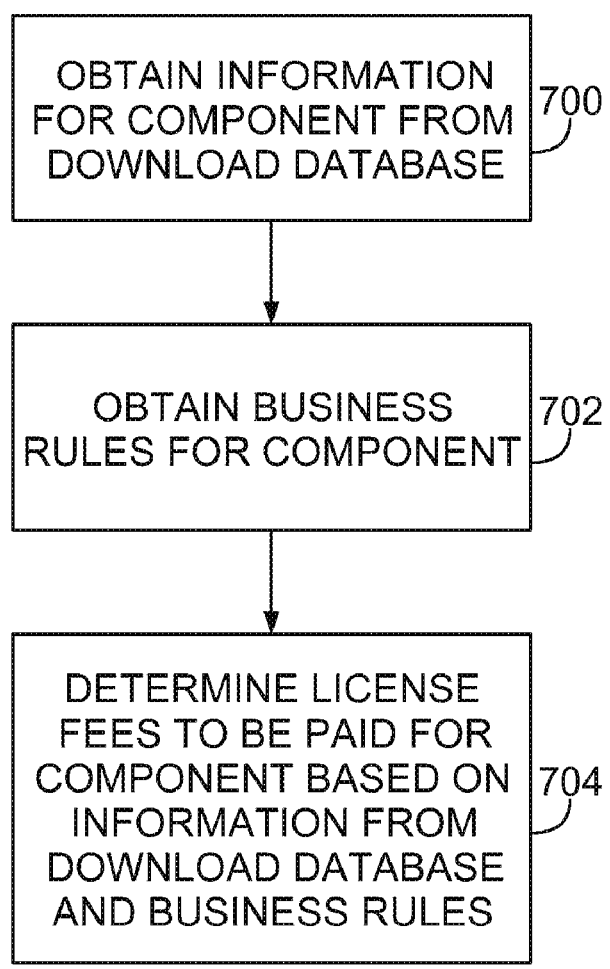
FIG. 7 is a flowchart illustrating an embodiment of a process for determining licensing fees to be paid for a component.

FIG. 7 is a flowchart illustrating an embodiment of a process for determining licensing fees to be paid for a component. In the example shown, the process may be performed by a business process to determine licensing fees to be paid by a software company to a licensing pool or licensor. In some embodiments, the process is decoupled from or otherwise independent of processing performed by a download server.

At 700, information for a component is obtained from a download database. In some embodiments, information in a download database is filtered so that a subset of information is obtained. Filtering may, for example, remove entries in a download database that are associated with a component other than the one for which licensing fees are being determined at this time. In some embodiments, a component is included in multiple applications, and the licensing fees for that component are being determined for a subset of those applications (e.g., one application in particular). In some embodiments, information from a download database is filtered based on product ID (i.e., the particular application).

Business rules are obtained for a component at 702. Business rules describe how licensing fees are charged for a particular component. Business rules may be updated as needed, for example, if there is some change to a licensing agreement or there was a misinterpretation in how to charge licensing fees for a component.

At 704, license fees to be paid for a component are determined based on information from a download database and business rules. For example, in some cases the business rules specify that for each download of a component a licensing fee is assessed. The licensing payments for that component may be the number of downloads (minus any duplicates) multiplied by the licensing fee for one download.

In some cases, a component is associated with different licensing fees, where depending upon the circumstances a certain licensing fee is charged. For example, a given component may be included in two applications. The business rules may specify a first licensing fee (e.g., per download) for the first application and a second licensing fee for the second application.

In some cases, there is a sliding scale for licensing fees. For example, if a component is downloaded less than a specified number of times (in some embodiments, after removing duplicates) a first licensing fee per download is charged. Otherwise, if the component is downloaded more than the specified number of times, a second licensing fee per download is charged.

In some cases, there is a volume licensing agreement where a certain number of licenses are prepaid (e.g., typically for a lower licensing fee per unit). These are some examples of business rules and how licensing payments may be determined based on the information in a download database and business rules. In some embodiments, information in addition to or as an alternative to business rules or information from a download database is used in determining licensing payments.

In some embodiments, the process is modified from the example process described herein. In some embodiments the illustrated process is repeated as needed to determine licensing payments for different components. For example, licensing payments may be determined for a first component. The process is repeated to determine licensing payments for a second component. In some embodiments, a process is able to simultaneously determine licensing payments for multiple components.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   providing, using a processor, an application and a component to a device, wherein:
      the component is associated with a licensing fee; and
      the application includes a first set of one or more application operations that are able to be performed without requiring the component to be used;
   receiving, at the processor, a request to access a second set of one or more application operations that do not overlap with the first set of application operations and which are provided at least in part by the component;
   recording information associated with the received request, wherein the recorded information is used in determining licensing fee related payment to be paid for the component;
   determining licensing fee related payment to be paid for the component by:
      accessing the recorded information and determining a number of times the component was provided based at least in part on the recorded information;
      obtaining a number of times associated with a volume license agreement for which the component can be provided and payment has been pre-paid; and
      determining whether any additional payment is due by comparing (1) the number of times the component was provided and (2) the obtained number of times associated with the volume license agreement for which the component can be provided and payment has been pre-paid, wherein it is determined that no additional payment is due in the event the number of times the component was provided is less than or equal to the number of times associated with the volume license agreement for which the component can be provided and payment has been pre-paid; and using the processor to provide the component to the device independent of the determination whether any additional payment is due.

2. A method as recited in claim 1 further comprising obtaining user consent to obtain the component.

3. A method as recited in claim 1, wherein the component includes a CODEC.

4. A method as recited in claim 1, wherein the recorded information includes at least one of a serial number, a component identifier, an application identifier, a date, a time, information identifying which of a plurality of components is being provided, or information identifying which of a plurality of applications the component is being provided for.

5. A method as recited in claim 1, wherein providing the component includes using Hypertext Transfer Protocol (HTTP).

6. A method as recited in claim 1 further comprising identifying potential abuse using the recorded information.

7. A method as recited in claim 1 further comprising generating a report associated with using the recorded information.

8. A method as recited in claim 1, wherein the application and the component are provided to the device at a same time and the method further includes installing the component on the device in a deactivated state.

9. A method as recited in claim 8 further comprising activating the component installed on the device in a deactivated state by using the processor to provide the device with an activation keycode.

10. A method as recited in claim 1, wherein:
the recorded information includes a component identifier which identifies which one of a plurality of components the received request is associated with; and
the step of determining licensing fee related payment further includes determining, based at least in part on the component identifier included in the recorded information, which one of a plurality of licensors corresponds to the component identifier.

11. A system, comprising:
a processor; and
a memory coupled with the processor, wherein the memory is configured to provide the processor with instructions which when executed cause the processor to:
provide an application and a component to a device, wherein:
the component is associated with a licensing fee; and
the application includes a first set of one or more application operations that are able to be performed without requiring the component to be used;
receive a request to access a second set of one or more application operations that do not overlap with the first set of application operations and which are provided at least in part by the component;
record information associated with the received request, wherein the recorded information is used in determining licensing fee related payment to be paid for the component;
determine licensing fee related payment to be paid for the component by:

access the recorded information and determining a number of times the component was provided based at least in part on the recorded information;
obtain a number of times associated with a volume license agreement for which the component can be provided and payment has been pre-paid; and
determine whether any additional payment is due by comparing (1) the number of times the component was provided and (2) the obtained number of times associated with the volume license agreement for which the component can be provided and payment has been pre-paid, wherein it is determined that no additional payment is due in the event the number of times the component was provided is less than or equal to the number of times associated with the volume license agreement for which the component can be provided and payment has been pre-paid; and provide the component to the device independent of the determination whether any additional payment is due.

12. A system as recited in claim 11, wherein the instructions, provided by the memory to the processor, include instructions for providing the component using Hypertext Transfer Protocol (HTTP).

13. A system as recited in claim 11, wherein the recorded information includes at least one of a serial number, a component identifier, an application identifier, a date, a time, information identifying which of a plurality of components is being provided, or information identifying which of a plurality of applications the component is being provided for.

14. A system as recited in claim 11, wherein the application and the component are provided to the device at a same time and the memory is further configured to provide the processor with instructions to install the component on the device in a deactivated state.

15. A system as recited in claim 14, wherein the memory is further configured to provide the processor with instructions to activate the component installed on the device in a deactivated state, including by providing the device with an activation keycode.

16. A system as recited in claim 11, wherein:
the recorded information includes a component identifier which identifies which one of a plurality of components the received request is associated with; and
the instructions for determining licensing fee related payment further include instructions for determining, based at least in part on the component identifier included in the recorded information, which one of a plurality of licensors corresponds to the component identifier.

17. A computer program product, the computer program product being embodied in a computer readable storage medium and comprising computer instructions for:
providing an application and a component to a device, wherein:
the component is associated with a licensing fee; and
the application includes a first set of one or more application operations that are able to be performed without requiring the component to be used;
receiving a request to access a second set of one or more application operations that do not overlap with the first set of application operations and which are provided at least in part by the component;
recording information associated with the received request, wherein the recorded information is used in determining licensing fee related payment to be paid for the component;

determining licensing fee related payment to be paid for the component by:
  accessing the recorded information and determining a number of times the component was provided based at least in part on the recorded information;
  obtaining a number of times associated with a volume license agreement for which the component can be provided and payment has been pre-paid; and
  determining whether any additional payment is due by comparing (1) the number of times the component was provided and (2) the obtained number of times associated with the volume license agreement for which the component can be provided and payment has been pre-paid, wherein it is determined that no additional payment is due in the event the number of times the component was provided is less than or equal to the number of times associated with the volume license agreement for which the component can be provided and payment has been pre-paid; and
  providing the component to the device independent of the determination whether any additional payment is due.

18. A computer program product as recited in claim 17 further comprising computer instructions for providing the component using Hypertext Transfer Protocol (HTTP).

19. A computer program product as recited in claim 17, wherein the recorded information includes at least one of a serial number, a component identifier, an application identifier, a date, a time, information identifying which of a plurality of components is being provided, or information identifying which of a plurality of applications the component is being provided for.

20. A computer program product as recited in claim 17, wherein the application and the component are provided to the device at a same time and the computer program product further includes computer instructions for installing the component on the device in a deactivated state.

21. A computer program product as recited in claim 20 further comprising computer instructions for activating the component installed on the device in a deactivated state by providing the device with an activation keycode.

22. A computer program product as recited in claim 17, wherein:
  the recorded information includes a component identifier which identifies which one of a plurality of components the received request is associated with; and
  the computer instructions for determining licensing fee related payment further include computer instructions for determining, based at least in part on the component identifier included in the recorded information, which one of a plurality of licensors corresponds to the component identifier.

* * * * *